US005221577A

United States Patent [19]

Inaba et al.

[11] Patent Number: 5,221,577

[45] Date of Patent: Jun. 22, 1993

[54] TRANSFER TAPE FOR MASKING CORRECTION

[75] Inventors: Masatsugu Inaba; Koji Kiyomura; Sigeki Kusuba, all of Osaka, Japan

[73] Assignee: Fuji Kagakushi Kogyo Co., Ltd., Osaka, Japan

[21] Appl. No.: 770,824

[22] Filed: Oct. 4, 1991

[30] Foreign Application Priority Data

Oct. 5, 1990 [JP] Japan ............ 2-269046

[51] Int. Cl.[5] ............ B32B 7/12

[52] U.S. Cl. ............ 428/354; 428/355

[58] Field of Search ............ 428/343, 354, 355

[56] References Cited

U.S. PATENT DOCUMENTS 3,664,869 5/1972 Sala et al. ............ 117/2 TC 4,891,260 1/1990 Kunkel et al. ............ 428/220

FOREIGN PATENT DOCUMENTS 0170222 2/1986 European Pat. Off. .

0318804 6/1989 European Pat. Off. .

2810471 9/1979 Fed. Rep. of Germany .

2604390 4/1988 France .

OTHER PUBLICATIONS

Patent Abstract of Japan, vol. 11, No. 105, Apr. 3, 1987 of JP-A-61 252 185, Nov. 10, 1986.

*Primary Examiner*—Jenna L. Davis

*Attorney, Agent, or Firm*—Armstrong, Westerman, Hattori, McLeland & Naughton

[57] ABSTRACT

A transfer tape for masking correction comprising a film-like foundation and a pressure-transferable masking layer containing a coloring pigment provided on the foundation, said pressure-transferable masking layer comprising a hiding layer comprising a coloring pigment and a vehicle, and a pressure-sensitive adhesive layer provided on the surface of the hiding layer, said vehicle of said hiding layer having an elongation at break of not less than $3.5\times10^2\%$, said hiding layer having a porous structure with a porosity of 30 to 50% and having a tensile strength of not more than $1.7\times10^2$ $g/mm^2$. Masking operation using the transfer tape can be conducted with ease, erroneous images on a paper can be completely hidden and clear images can be formed on the masked portion.

5 Claims, 2 Drawing Sheets

TRANSFER TAPE FOR MASKING CORRECTION

BACKGROUND OF THE INVENTION

The present invention relates to a transfer tape for masking correction. More particularly, it relates to a transfer tape for use in a method of correcting erroneous images by means of masking wherein the transfer tape is pressed onto the surface of a paper or other articles having the erroneous images by means of a hand-operative pressing device to transfer the pressure-transferable masking layer thereof onto the surface, thereby masking the erroneous image on the surface from view, and thereafter the correct image can be written on the transferred masking layer by means of a writing device such as ball-point pen or pencil.

Heretofore there has been known a masking correction transfer tape of this type wherein a pressure-transferable masking layer containing a white pigment was provided on one surface of a film-like foundation. A hand-operative transfer device using the transfer tape was also known.

With respect to the masking correction transfer tape of this type, the important factor for determining whether the tape is good or bad is whether the tape satisfies all of the following requirements:

(1) Breaking property of the masking layer '

When pressure is applied to a given portion of the masking layer, that portion is readily separated from the remaining portions and any undesired portion is not transferred.

(2) Crack resistance of the masking layer

When a desired portion of the masking layer is transferred, cracks do not occur in the transferred masking layer.

(3) Transferability of the masking layer

When a pressure is applied to a given portion of the masking layer, the whole of that portion is completely transferred.

(4) Writing property

When a letter or the like is written on the transferred masking layer with a writing device such as pencil or ball-point pen, the flatness of masking layer does not vary, due to the writing pressure.

In the case of using the transfer tape in the hand-operative transfer device, all of the above-mentioned requirements are very important, because better performance than that of a conventional correction liquid is required.

However, none of the conventional correction transfer tapes of this type have satisfied all of the above four requirements. For example, a correction transfer tape, which was fit for use with respect to the breaking property, was poor in the crack resistance, and another correction transfer tape, which was fit for use with respect to the crack resistance, was poor in the breaking property. Still another conventional correction transfer tape wherein a wax was incorporated in the vehicle of the masking transfer layer to improve its pressure-transferability, resulting in good breaking property, had the drawback that it was poor in the crack resistance and writing property.

It is an object of the present invention to provide a transfer tape for masking correction which is excellent in all properties of breaking, crack resistance, transferability and writing property and accordingly able to achieve a favorable masking correction.

Another object of the present invention is to provide a transfer tape for masking correction which exhibits excellent effects when it is used in a hand-operative transfer device.

These and other objects will become apparent from the description hereinafter.

SUMMARY OF THE INVENTION

The present invention provides a transfer tape for masking correction comprising a film-like foundation and a pressure-transferable masking layer containing a coloring pigment provided on the foundation, said pressure-transferable masking layer comprising a hiding layer comprising a coloring pigment and a vehicle, and a pressure-sensitive adhesive layer provided on the surface of the hiding layer, said vehicle of said hiding layer having an elongation at break of not less than $3.5\times10^2\%$, said hiding layer having a porous structure with a porosity of 30 to 50% and a tensile strength of not more than $1.7\times10^2$ g/mm$^2$.

The masking correction transfer tape is excellent in all of the breaking property, transferability, crack resistance and writing property. Therefore erroneous images can be masked completely from view by using the transfer tape of the present invention and thereafter clear images can be formed on the masked images.

DETAILED DESCRIPTION

Figure 1:
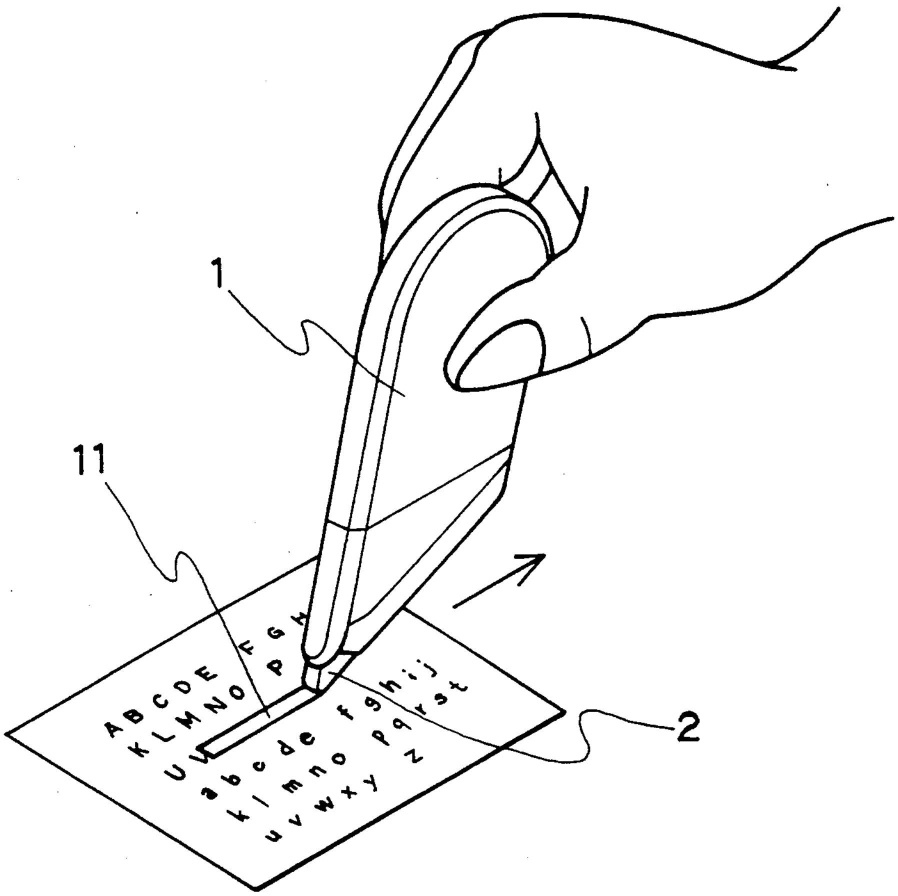
FIG. 1 is an explanatory view showing a masking operation using a transfer device equipped with the masking correction transfer tape of the present invention.

The masking correction transfer tape of the present invention comprises a film-like foundation and a pressure transferable masking layer provided on one surface of the foundation, the masking layer comprising the above-mentioned specific hiding layer and a pressure-sensitive adhesive layer provided on the hiding layer.

Herein the porosity of the hiding layer is represented by the following formula:

$$Porosity\ (\%)=[(A-B/C)/A]\times100$$

wherein A, B and C mean the following:

A: Thickness (μm) of the hiding layer (value measured with a thickness measuring apparatus available under the commercial name "Millitoron")

B: Dry coating amount of the hiding layer (g/m$^2$)

C: Density )g/cm$^3$) of the molded solid matter of the hiding layer by compression molding under a pressure of 5 kg/cm$^2$, measured by a density-gradient tube method.

The hiding layer in accordance with the present invention comprises a vehicle and a coloring pigment contained in the vehicle, and has a porous structure with a porosity of 30 to 50% and a tensile strength of not more than $1.7\times10^2$ g/mm$^2$, wherein the vehicle has an elongation at break of not less than $3.5\times10^2\%$.

When the masking transfer tape of the present invention is pressed onto a paper surface or the like, the pressure-transferable masking layer is firmly adhered to the surface due to the presence of the pressure-sensitive adhesive layer, and the masking layer is almost surely broken or cut at the boundary between the portion where the pressure is applied and the portion where the pressure is not applied, because of the small tensile strength of the hiding layer, which value is not more than $1.7 \times 10^2$ g/mm$^2$, thus realizing excellent breaking property.

Since the hiding layer is composed of the vehicle having such a great elongation at break as mentioned above, the hiding layer is smoothly transferred and adapted to the surface of an article to be subject to the correction treatment, thus realizing excellent crack resistance and also excellent transferability without causing any partially untransferred portion.

If the elongation at break of the vehicle for the hiding layer is simply increased up to such a great value as mentioned above, the portion of the masking transfer layer which is present beyond the above-mentioned boundary and must not be transferred would be peeled off from the foundation by being drawn by the portion transferred. In the present invention, however, the above phenomenon that the portion not to be transferred is peeled off from the foundation by being drawn by the portion transferred is prevented, nevertheless the great elongation of the vehicle being not less than $3.5 \times 10^2$%, by imparting to the hiding layer a porous structure with a porosity of 30 to 50%. That is, the hiding layer is designed to have the above-mentioned tensile strength range in which the hiding layer exhibits good breaking property, by endowing the hiding layer with the above-mentioned porous structure with a high porosity.

Further, the transferred hiding layer becomes denser than the layer before transfer because its porous structure is broken by the pressure applied thereto upon transferring. As a result, when an image is written on the transferred hiding layer with a ball-point pen or a pencil, the portion adjacent to the written image does not rise thus realizing excellent writing property.

When the vehicle for the hiding layer is preferably composed of a mixture of a rubber-like resin and a glassy resin having a small elongation at break, it is possible to obtain a hiding layer having a better breaking property, as well as better writing property, because the hiding layer after transfer has an increased hardness suitable for writing.

Further, the hiding layer wherein the vehicle is composed of a mixture of a rubber-like resin and a glassy resin, even in the correction of letters written in an ink using a dye, does not cause the problem that the dye in the ink permeates into the hiding layer to hinder the hiding power thereof. It is also possible to further improve the smoothness of writing by adjusting the proportion of the rubber-like resin and the glassy resin.

Moreover, when the dry coating amount of the pressure-sensitive adhesive layer is preferably within a range of 1 to 5 g/m$^2$, and more preferably a range of 2 to 4 g/m$^2$, in relation to the porosity range of 30 to 50% for the hiding layer, the adhesive is prevented from oozing out to the surface of the transferred hiding layer through the pores thereof, so that the hiding layer is prevented from adhering to another article after transfer.

The present invention will be more specifically explained below.

The vehicle used for the hiding layer in the present invention has an elongation at break of not less than $3.5 \times 10^2$% (the value measured at ordinary temperatures according to the test method provided in ASTM D-412). When the elongation is less than $3.5 \times 10^2$%, the crack resistance becomes poor and some of the transfer layer tends not to transfer. The upper limit of the elongation of the vehicle is usually $5.2 \times 10^2$%.

A resin having an elongation at break falling within the above range can be used alone as the vehicle. The preferred vehicle is a mixture of a rubber-like resin and a glassy resin, especially a mixture of a rubber-like resin having an elongation at break of not less than $4.5 \times 10^2$% and a glassy resin having an elongation at break of not more than 50%.

Preferable rubber-like resins are those having a softness even with a small amount of a plasticizer. Examples of the rubber-like resins are usual synthetic rubbers or rubber-like resins including styrene-butadiene-styrene block copolymer (SDS), styrene-ethylene-butylene-styrene block copolymer (SEBS), styrene-butadiene rubber, styrene-isoprene-styrene block copolymer (SIS), styrene-ethylene/propylene block copolymer (SEP), urethane rubber, fluorine-containing rubber, acrylonitrile-butadiene rubber, ethylene-vinyl acetate copolymer, ethylene-ethyl acrylate copolymer, chlorosulfonated polyethylene and cyclized rubber. These rubber-like resins may be used alone or in admixtures.

Preferable glassy resins are those having a small elongation at break, a melting or softening temperature of not less than 100° C. and a high hardness. Examples of the glassy resins are saturated or unsaturated alicyclichydrocarbon resins, styrene-acryl copolymer, ketone resin, vinyl chloride-vinyl acetate copolymer, and polyolefins such as polyethylene and polypropylene. These glassy resins may be used alone or in admixtures.

The proportion of the glassy resin to the rubber-like resin in the above-mentioned preferred vehicle varies depending upon the elongation value of the rubber-like resin used and of the glassy resin used. The proportion is adjusted so that the resulting vehicle has an elongation at break of not less than $3.5 \times 10^2$%. In that case, it is possible to obtain a vehicle exhibiting more excellent effects in softness, writing property and breaking property by using a rubber-like resin having an elongation at break of not less than $4.5 \times 10^2$% and a glassy resin having an elongation at break of not more than 50% in combination. A typical proportion is from 2 to 30 parts (parts by weight, hereinafter the same), preferably from 5 to 15 parts, of the glassy resin to 10 parts of the rubber-like resin. The vehicle composed of the rubber-like resin and the glassy resin in such proportions has a suitable elasticity and gives a hiding layer exhibiting excellent writing property after the transfer. When the proportion of the glassy resin is more than the above range or the vehicle is composed of the glassy resin alone, the hiding layer is poor in softness and cracks tend to occur in the hiding layer upon transferring. When the proportion of the glassy resin is less than the above range, the hiding layer exhibits is poor writing property as well as in breaking property. When the vehicle is composed of the rubber-like resin alone, the hiding layer is poor in the breaking property.

For the purpose of endowing the hiding layer with the above-mentioned porosity, generally a porosity adjusting agent is incorporated into the hiding layer. Examples of the porosity adjusting agent are magnesium carbonate, calcium carbonate, barium carbonate, barium sulfate, aluminum oxide, silicon oxide, sellaite, clay and talc. The particle size of the porosity adjusting agent is preferably from 1 to 20 $\mu$m. When the particle size is too small, the hiding layer is poor in the breaking property. When the particle size is too large, the hiding layer is poor in the writing property.

The porosity adjusting agent is preferably used in an amount of from 5 to 40 parts, more preferably from 8 to 18 parts, per 10 parts of the vehicle. When the amount of the porosity adjusting agent is too large, chalking tends to occur in the hiding layer. When the amount of the porosity adjusting agent is too small or no porosity adjusting agent is used, the breaking property of the hiding layer is reduced.

The porosity of the hiding layer can be adjusted by selecting the kind or amount of the porosity adjusting agent. When the porosity is less than 30%, the breaking property of the hiding layer is poor. When the porosity is more than 50%, the writing property and the crack resistance of the hiding layer are poor.

The hiding layer has a tensile strength of not more than $1.7\times10^2$ g/mm$^2$ (the value measured at ordinary temperatures by means of a tensile testing machine available under the commercial name "Autograph AG-100A", made by SHIMADZU CORPORATION. When the tensile strength is more than the above range, the breaking property is reduced. The lower limit of the tensile strength is usually $0.4\times10^2$ g/mm$^2$.

Usually the hiding layer is colored white because the article to be subjected to the correction operation is generally white paper. However, when the article is paper or the like colored in a color other than white, the hiding layer is colored in substantially the same color as the back ground color of the subject article so that the masked parts are not distinguished from the back ground part and not striking.

Usually titanium oxide powder is used as the white pigment for coloring the hiding layer in white due to its strong hiding power. A color adjusting agent may be used together with the white pigment to adjust the color of the hiding layer. Examples of the color adjusting agent are aluminium powder, copper powder, brass powder and dyes.

Examples of coloring pigments other than white pigment are inorganic pigments such as Titanium Yellow, iron oxide pigments, ultramarine, Cobalt Blue, Chromium Oxide Green, Spinel Green, Chrome Yellow, Chrome Vermilion, Cadmium Yellow and Cadmium Red, and organic pigments such as azo lake pigments, Hanza pigments, benzimidazolone pigments, monoazo pigments, diarylide pigments, pyrazolone pigments, condensed azo pigments, phthalocyanines, quinacridone pigments, perylene pigments, perynone pigments, dioxazine pigments, anthraquinone pigments and isoindolinone pigments.

The amount of the coloring pigment varies depending upon its dispersibility to the vehicle, its hiding power, etc. Generally, however, the amount is preferably from 5 to 40 parts, and more preferably from 10 to 20 parts, per 10 parts of the vehicle. When the amount of the pigment is too large, the chalking phenomenon wherein a pigment powder bleeds out to the surface of the hiding layer tends to occur. When the amount of the pigment is too small, the hiding power of the hiding layer is insufficient.

When the hiding layer is colored in another color than white, the above-mentioned coloring pigments other than the white pigment are preferably used in combination with titanium oxide to compensate for their relatively poor hiding power. In that case, titanium oxide is preferably used in an amount of at least 5 parts, more preferably at least 10 parts, per 10 parts of the vehicle, and another coloring pigment is preferably used so that the total amount of the pigment and titanium oxide falls within the above mentioned range of from 5 to 40 parts, preferably from 10 to 20 parts, per 10 parts of the vehicle.

The thickness of the hiding layer is preferably from about 20 to about 40 μm. When the thickness is less than about 20 μm, the hiding power is insufficient. When the thickness is more than about 40 μm, the problem occurs that when a copy of the corrected paper is taken, the boundary between the corrected portion and uncorrected portion is copied as a shadow, so that the obtained copy is obscure.

A pressure-sensitive adhesive layer is provided on the above-mentioned hiding layer. Any conventional pressure-sensitive adhesive can be used for the adhesive layer so long as it preferably exhibits a strong adhesiveness to paper and a poor adhesiveness to the foundation of the masking tape. Examples of the adhesive are acrylic resin adhesives and rosin adhesives. Typical examples are DNC-1 (commercial name, made by DAINIPPON INK AND CHEMICALS, INC.), AB-461 (commercial name, made by Showa Kobunshi Kabushiki Kaisha), NIKASOL TS662 (commercial name, made by Nippon Carbide Industries Co., Inc.).

The dry coating amount of the adhesive is preferably from 1 to 5 g/m$^2$, and more preferably from 2 to 4 g/m$^2$. When the coating amount is more than the above range, when the resulting tape is processed into a pancake form, the so-called problem of off-set occurs, i.e. the phenomenon that the pressure-sensitive adhesive layer or the hiding, layer adheres to the back surface of the foundation, which tends to occur at portions near the winding core. When the coating amount is less than the above range, the resulting tape is poor in the transferability and the writing property.

As the above-mentioned film-like foundation, there can be used plastic films such as polyethylene terephthalate (PET) film, polyethylene film and polypropylene film, and papers. The thickness of the foundation is preferably from about 10 to about 50 μm.

If necessary, one or both surfaces of the foundation may be coated with a releasing agent for the purpose of preventing the adhesive layer from adhering to the back surface of the foundation during storage or facilitating the peeling of the masking transfer layer from the foundation. Examples of the releasing agent are silicones and fluorine-containing resins. Commerically available foundations coated with a releasing agent can also be used, including 40GW (commercial name, made by Honshu Paper Co., Ltd.) with respect to paper foundation, and 50RLW-01 (commercial name, made by Honshu Paper Co., Ltd.) with respect to PET film foundation.

Correction using the masking correction transfer tape of the present invention can be effected by putting the tape on a surface to be corrected so that the pressure-sensitive adhesive layer is brought in contact with the surface and transferring the masking transfer layer to the surface by application of pressure to the tape by means of an appropriate pressing means.

In conducting the correction operation with the correction transfer tape of the present invention, a commercially available hand-operative transfer device can be suitably employed.

Figure 2:
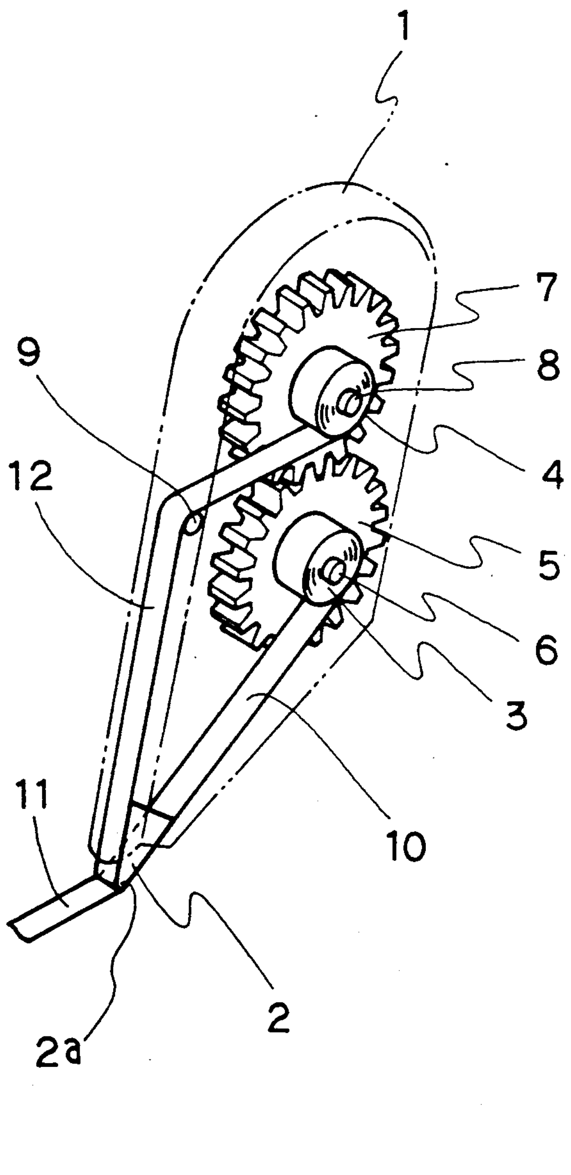
FIG. 2 is a perspective view showing the inside of the transfer device.

FIG. 1 is an explanatory view showing the operation of masking correction using such a hand-operative transfer device, and FIG. 2 is a perspective view showing the inside of the transfer device.

Referring to FIGS. 1 and 2, reference numeral 1 indicates the body (holder) of the transfer device.

A cassette containing therein a correction transfer tape is loaded in the body 1. Reference numerals 3 and 4 indicate a dispensing reel and a winding reel, respectively, for the correction transfer tape 10. The dispensing reel 3 on which the tape 10 is wound and the winding reel 4 are contained in the cassette and the cassette is in turn contained in the body 1. In FIG. 2, the cassette is not shown. A dispensing gear 5 and a winding gear 7 are mounted in a mesh relationship in the body 1. The dispensing reel 3 and the winding reel 4 are mounted on the shaft 6 of the dispensing gear 5 and the shaft 8 of the winding gear 7, respectively. The correction transfer tape 10 is dispensed from the dispensing reel 3 and wound up onto the winding reel 4 through a press member 2 and a tension pin 9. The press member 2 is usually wedge-shaped.

The correction operation using the above-mentioned transfer device will be explained. When the body 1 of the transfer device is moved in the direction indicated by the arrow with the edge 2a of the press member 2 being in contact with the surface to be corrected under application of pressure, the portion of the tape 10 which is pressed to the surface with the edge 2a is adhered to the surface on the adhesive layer side. The tape 10 is successively dispensed from the dispensing reel 3 and adhered as the body 1 is moved. The gear 5 which is rotated with rotation of the dispensing reel 3 drives the gear 7, which in turn rotates the winding reel 4. The tape 10 is separated into the foundation 12 and the masking transfer layer 11 adhered to the surface to be corrected at the time when it passes through the edge 2a of the press member 2, and only the separated foundation 12 is wound onto the winding reel 4. At the time when a desired length of the masking transfer layer 11 is transferred to the surface to be corrected, the edge 2a of the press member 2 is once pressed hard to the surface and then the body 1 is lifted, whereby the masking transfer layer 11 is cut at the portion which is pressed against the edge 2a of the press member 2, finishing the correction operation.

The present invention is more specifically described and explained by means of the following Examples. It is to be understood that the present invention is not limited to the Examples, and various change and modifications may be made in the invention without departing from the spirit and scope thereof.

EXAMPLES 1 to 3

Each hiding layer having the composition shown in Table 1 was formed on a foundation.

That is, 100 parts of each composition and 163 parts of toluene were mixed by means of an attritor for 20 min. to give a coating liquid. The coating liquid was applied to one surface of a PET film having a thickness of 50 $\mu$m and coated with a releasing agent on both sides, by means of a gravure coater, thereby forming a hiding layer having a thickness of 28 $\mu$m and the physical properties shown in Table 2.

Then an adhesive (DNC-1) was applied to the surface of the hiding layer to give an adhesive layer having a dry coating amount of 3 g/m$^2$. Thus a transfer tape for masking correction was obtained.

The transfer tape was slit into specimens each having a width of 5 mm, and each specimen having a length of 12 m was wound simultaneously with the slitting onto a core to give a sample in the form of a pancake having a diameter of 3.4 cm.

COMPARATIVE EXAMPLES 1 TO 4

Employing each composition shown in Table 1, a hiding layer having the physical properties shown in Table 2 was formed on the foundation in the same manner as in Examples 1 to 3. On the hiding layer was formed an adhesive layer in the exactly same manner as in Examples 1 to 3, yielding a transfer tape for masking correction, from which a sample in the form of a pancake was obtained.

Each of the transfer tapes in the pancake form obtained in Examples 1 to 3 and Comparative Examples 1 to 4 was mounted in the transfer device shown in FIGS. 1 to 2. Employing the transfer device, the masking transfer layer of the tape was transferred to a high quality white paper bearing letters imprinted in black ink under a load of 600 g.

As a result, the black letters on the paper was completely hidden with the masking layer transferred.

Further, with respect to the following properties, evaluation was conducted.

(1) Breaking property

It was observed whether the transfer layer was broken or cut at the edge of the press member of the transfer device at a finish press position. The term "finish press position" means the position where the transfer layer is pressed down with the edge of the press member to cut it after a desired length of the transfer layer is transferred. The cutting operation was conducted 10 times and it was determined whether the transfer layer was cut at the finish press position. If the transfer layer was cut, the number of the case wherein the transfer layer was cut at a position 1 mm or more beyond the finish press position was determined. The results thereof were scored as follows:

Point 0=There were one or more cases wherein the transfer layer was not cut.

Point 1=The number of the case wherein the transfer layer was cut at a position 1 mm or more beyond the finish press position was three or more.

Point 2=The number of the case was two.

Point 3=The number of the case is only one or zero.

(2) Transferability

The operation of moving the transfer device 150 mm was conducted 10 times. The number of the portion wherein the transfer layer was not partially transferred was determined. The results thereof were scored as follows:

Point 0=The number of the portion was three or more.

Point 1=The number of the portion was two.

Point 2=The number of the portion was only one or zero.

(3) Crack resistance

The operation of moving the transfer device 150 mm was conducted one time. The surface of the transfer layer transferred was observed through a magnifying lens with 10 magnifications. The number of the portion wherein cracks occurred was determined. The results thereof were scored as follows:

Point 0=The number of the portion was three or more.

Point 1=The number of the portion was two.

Point 2=The number of the portion was only one or zero.

(4) Writing property

FIGS., 1 through 10, were written on the hiding layer transferred to the high quality paper with a ball-point pen. It was observed whether any rise of the hiding layer due to the writing occurred and the number of the rise was determined. The results thereof were scored as follows:

Point 0=The number of the rise was three or more.
Point 1=The number of the rise was two.
Point 2=The number of the rise was only one or zero.

The results of the above test are shown in Table 2.

TABLE 1

| Composition (% by weight) | Ex. 1 | Ex. 2 | Ex. 3 | Com. Ex. 1 | Com. Ex. 2 | Com. Ex. 3 | Com. Ex. 4 |
|---|---|---|---|---|---|---|---|
| Titanium oxide (particle size: 0.1 to 1 μm) | 37.8 | 47.8 | 33.8 | 37.8 | 53.8 | 68.8 | 11.0 |
| Magnesium carbonate (particle size: 1 to 10 μm) | 31.0 | 21.0 | 27.0 | 31.0 | 15.0 | 0 | 57.8 |
| Styrene-ethylene-butylene-styrene copolymer (elongation at break: 750%) | 14.0 | 0 | 18.0 | 0 | 0 | 0 | 0 |
| Ethylene-vinyl acetate copolymer (elongation at break: 760%) | 0 | 14.0 | 0 | 0 | 0 | 0 | 0 |
| Non-yellowing urethane resin (elongation at break: 380%) | 0 | 0 | 0 | 18.0 | 28.0 | 28.0 | 28.0 |
| Alicyclic saturated hydrocarbon resin (elongation at break: 0%) | 14.0 | 0 | 18.0 | 10.0 | 0 | 0 | 0 |
| Ketone resin (elongation at break: 0%) | 0 | 14.0 | 0 | 0 | 0 | 0 | 0 |
| Dispersing agent (Homogenol L-18) | 3 | 3 | 3 | 3 | 3 | 3 | 3 |
| Aluminum powder (particle size: 0.1 to 3 μm) | 0.2 | 0.2 | 0.2 | 0.2 | 0.2 | 0.2 | 0.2 |

TABLE 2

| | Hiding layer | | | | Coating amount of adhesive | Evaluation | | | |
|---|---|---|---|---|---|---|---|---|---|
| | Elongation at break of vehicle (%) | Tensile strength ($\times 10^2$ g/mm$^2$) | Porosity (%) | Thickness (μm) | (g/m$^2$) | Breaking property | Transfer-ability | Crack resistance | Writing property |
| Ex. No. | | | | | | | | | |
| 1 | 370 | 0.8 | 42 | 28 | 3 | 3 | 2 | 2 | 2 |
| 2 | 360 | 0.7 | 38 | 28 | 3 | 2 | 2 | 2 | 2 |
| 3 | 370 | 1.6 | 42 | 28 | 3 | 2 | 2 | 1 | 2 |
| Com. Ex. | | | | | | | | | |
| 1 | 270 | 1.2 | 42 | 28 | 3 | 1 | 2 | 0 | 1 |
| 2 | 380 | 2.0 | 30 | 24 | 3 | 0 | 2 | 0 | 1 |
| 3 | 380 | 3.1 | 19 | 20 | 3 | 0 | 2 | 1 | 1 |
| 4 | 380 | 0.6 | 53 | 36 | 3 | 2 | 1 | 0 | 0 |

The results of Table 2 reveal that the masking transfer type of the present invention is excellent in all of the breaking property, transferability, crack resistance and writing property.

EXAMPLE 4

The same procedures as in Example 1 to 3 except that the composition mentioned below was used to form a hiding layer having a porosity of 40% and a tensile strength of 100 g/mm$^2$ were repeated to give a transfer tape in pancake form.

| Component | Parts |
|---|---|
| Brilliant Carmine 6B | 20.0 |
| Titanium oxide (particle size: 0.1 to 1 μm) | 27.0 |
| Magnesium carbonate (particle size: 1 to 10 μm) | 22.0 |
| Styrene-ethylene-butylene-styrene copolymer (elongation at break: 750%) | 14.0 |
| Alicyclic saturated hydrocarbon resin (elongation at break: 0%) | 14.0 |
| Dispersing agent (Homogenol L-18) | 3.0 |
| | 100.0 |

Note: Elongation at break of the vehicle: 365%

Employing the transfer tape, the correction operation was conducted to mask the letters imprinted in black ink on a high quality paper colored in light vermilion in the same manner as in Examples 1 to 3.

As a result, the black letters on the paper were completely hidden with the masking layer transferred and the corrected portion was not so distinguished from the ground surface of the paper. Also good results were obtained with respect to the breaking property, transferability, crack resistance and writing property.

In addition to the materials and ingredients used in the Examples, other materials and ingredients can be used in the Examples as set forth in the specification to obtain substantially the same results.

What is claimed is:

1. A transfer tape for masking correction comprising a) a base; and b) a pressure-transferable masking layer disposed on the base, the pressure-transferable masking layer comprising a hiding layer comprising a coloring pigment and a vehicle having an elongation at break of not less than $3.5\times10^2$%, the hiding layer having a tensile strength of not more than $1.7\times10^2$ g/mm$^2$ and a porous structure with a porosity of 30 to 50%, and a pressure-sensitive adhesive layer disposed on the surface of the hiding layer.

2. The transfer tape of claim 1, wherein said vehicle comprises a mixture of a rubbery resin and a. glassy resin having a small elongation at break.

3. The transfer tape of claim 2, wherein said glassy resin has an elongation at break of not more than 50% and said rubbery resin has an elongation at break of not less than $4.5\times10^2$%.

4. The transfer tape of claim 1, wherein said coloring pigment is a white pigment.

5. The transfer tape of claim 1, wherein the tensile strength of the hiding layer is not less than about $0.4\times10^2$ g/mm$^2$.

* * * * *